United States Patent Office 3,379,765
Patented Apr. 23, 1968

3,379,765
PREPARATION OF PERFLUORINATED KETONES
Louis G. Anello, Basking Ridge, and Richard F. Sweeney, Dover, N.J., assignors to Allied Chemical Corporation, New York, N.Y., a corporation of New York
No Drawing. Filed Jan. 22, 1965, Ser. No. 427,484
19 Claims. (Cl. 260—586)

ABSTRACT OF THE DISCLOSURE

Certain chlorinated aliphatic ketones are perfluorinated with inorganic metal fluorides such as potassium fluoride. Novel perfluorocyclopentanediones and perfluorocyclohexanediones and hydrates thereof with utility as solvents for nylon-6 are prepared.

---

This invention relates to a process for the preparation of perfluorinated, aliphatic, saturated ketones and more particularly to the perfluorination of a limited and specific class of perchlorofluoro-aliphatic saturated ketones with certain inorganic metal fluorides.

Inorganic metal flouorides, notably alkali metal fluorides, and particularly potassium fluoride (KF), are known fluorinating agents and have been used to effect replacement of chlorine with fluorine atoms in a number of chemical compounds; halogen-containing hydrocarbons, alcohols, esters, ethers and amides, being exemplary.

Fluorination, and particularly perfluorination of ketones, however, has posed special problems due to the well known tendency of these materials to dissociate and from a variety of decomposition products under fluorinating conditions. For example, acetone when fluorinated with a strong fluorinating agent, such as elemental fluorine, yields some $CF_3COCF_3$, but a major amount of a by-product mixture containing $CH_2FCOCH_3$, $CF_4$, $COF_2$, $CF_3COF$ and $(COF)_2$. The by-product mixture results through cleavage and self-condensation of the acetone starting material and partially fluorinated derivatives thereof. If it is attempted to perfluorinate acetone using a milder fluorinating agent, such as cobaltic fluoride; it is found that no $CF_3COCF_3$ is formed at all. The ketone molecule is completely cleaved into $COF_2$, $CHF_3$, $CH_3COF$, $CH_2F_2$, $CH_3F$ and $CH_2FCOF$. It is recognized in the art that the above discussed behavior of acetone, when reacted with strong or weak fluorinating agents, is characteristic of aliphatic ketones in general. Strong fluorinating agents tend to fluorinate the starting aliphatic ketone molecule first and then split the resulting products so that although some perfluorinated ketone is formed, the major yield comprises hydrogenated derivatives and cleavage products. Mild fluorinating agents tend to cleave the starting aliphatic ketone molecule first and then fluorinate the fragments, so that no yield of the corresponding perfluorinated product is obtained.

Fluorination of perhalogenated ketones, such as perchloro- or perchlorofluoroketones, to yield the corresponding perfluorinated ketones is posible with HF, at elevated temperatures and with the aid of catalysts. Entailed are all the problems and difficulties involved when HF is handled at high temperatures. Moreover, although HF is capable, generally under controlled conditions, of producing more highly fluorinated products from less highly fluorinated materials; it is progressively more difficult to effect further substitution of fluorine for chlorine atoms as more and more fluorine substitution takes place. Thus, although perfluorination with HF is possible, it is difficult to bring about and the yields of perfluorinated product obtained, if any, are significantly low per pass. Indirect methods have also been used to prepare perfluorinated ketones. Hexafluoroacetone, for example, can be prepared by the oxidation of perfluoroisobutylene.

In summation, it has heretofore been considered necessary to resort either to the use of catalytic procedures using strong fluorinating agents, with the attendant handling problems involved therewith, or to the use of indirect processes in order to prepare perfluorinated ketones.

It is accordingly an object of this invention to provide a more commercially feasible, more easily controllable method for the preparation of perfluorinated, aliphatic, satuarted ketones, which method does not suffer from the disadvantages previously encountered by the art in other methods used for preparing such materials.

More specifically, it is an object of the invention to provide a simple, easily controllable method for the preparation of perfluorinated, aliphatic, saturated ketones in higher yields and conversions than has heretofore been obtainable.

It is another object of the invention to provide a novel non-catalytic process for the preparation of perfluorinated, aliphatic, saturated ketones.

A further object of the invention is to provide a process for the preparation of perfluorinated, aliphatic, saturated ketones in which conventional equipment of inexpensive construction, such as steel or glass, may be used.

Still another object of the invention is to provide a process for the preparation of perfluorinated, aliphatic, saturated ketones from readily obtainable, easily handleable reactants, at relatively low temperatures.

Yet another object of the invention is to provide a process for the preparation of perfluoroinated, aliphatic, saturated ketones in which the perfluorinated ketone product can be recovered efficiently and simply, such as by ordinary distillation.

Other objects and advantages of the invention will become apparent from the following description.

It has been found that the objects of the invention may be achieved by perfluorinating a specific class of perchlorofluoro-aliphatic, saturated ketone starting materials with certain inorganic metal fluorides. The inorganic metal fluorides suitable are KF, CsF, LiF and AgF and the reaction is preferably carried out in the presence of an inert polar solvent. The ease and efficiency with which the reaction takes place to form the corresponding perfluorinated products is remarkable and unexpected in view of the known difficulty and inefficiency with which other fluorinating agents react with ketones to form more highly fluorinated ketones containing the same number of carbon atoms. The novel perfluorination process of the invention may be carried out in ordinary laboratory glassware and the resulting perfluorinated ketone products are recovered in good yields and may be easily purified by simple distillation.

A critical limitation to the success of the process lies in the choice of the ketone starting materials. Only a particular class of perhalogenated, aliphatic, saturated ketone starting materials will react smoothly with the various inorganic metal fluorides, according to the invention process, to give the corresponding perfluorinated, aliphatic, saturated ketones in good yields and otherwise attain the objects of the invention. The class of starting materials suitable may be defined as perhologenated, aliphtic, saturated ketones in which all the halogen atoms are members selected from the group consisting of chlorine and fluorine, there being present one or more chlorine atoms, each of which is attached to a carbon atom which is in a position alpha to a ketone group, and one or more fluorine atoms. The term ketone is to be understood as being generic to polyketones, such as diketones and triketones, as well as monketones. In herent in the above definition is the fact that the molecules of such starting materials contain only carbon atoms, one or more of which are associated as ketone groups; one or more oxygen atoms, each of which is associated as a ketone group; one or more chlorine atoms associated in the above-indicated manner and one or more flourine atoms taking up the remainder of the unsatisfied valences of the carbon atoms. The term aliphatic is to be understood as embracing cycloaliphatic compounds as well as straight or branched, open-chain compounds. Mixed molecules, containing both cycloaliphatic as well as open-chain moieties, also come within the scope of the invention. The number of carbon atoms in the chain or ring, or the total number in both, is not critical to the operability of the invention process as described. Good results are obtainable in cases wherein the starting perhalogenated, aliphtic, saturated ketone possesses a very high number of carbon atoms. Better results are obtained, however, when the carbon content of the starting material does not exceed about twelve carbon atoms. Even better results are obtained when the carbon content of the starting material does not exceed eight carbon atoms and best results are obtained when the carbon content of the starting material does not exceed six carbon atoms.

For purposes of illustration and not by way of limitation, suitable starting materials may include the following from the indicated groups:

Straight-chain aliphtic perhalogenated saturated ketones sym-dichloroetetrafluoroacetone
asym-dichlorotetrafluoroacetone
monochloropentafluoroacetone
sym-tetrachlorodifluoroacetone
asym-tetrachlorodifluoroacetone
sym-trichlorotrifluoroacetone
asym-trichlorotrifluoroacetone
1,1-dichlorohexafluoro-2-butanone
2,2-dichlorooctafluoro-3-pentanone
3-chloroundecafluoro-2-hexanone
3-chloropentadecafluoro-4-octanone
4,4-dichlorodocosafluoro-3-dodecanone Branched-chain aliphatic perhalogenated saturated ketones 1,1,1-trichloro-4-trifluoromethylhexafluoro-2-pentanone
4,4-dichloro-5-trifluoromethyl-5-pentafluoroethyl-dodecafluoro-3-octanone Cycloaliphatic perhalogenated saturated ketones 2,2-dichlorotetrafluorocyclobutanone
2,4,4-trichlorotrifluorocyclobutanone
2,2-dichlorohexafluorocyclopentanone
2,2,5,5-tetrachlorotetrafluorocyclopentanone
2,2-dichlorooctafluorocyclohexanone Perhalogenated saturated polyketones 3,3-dichlorooctafluoro-2,4-hexanedione
2,4,5-trichlorotrifluoro-1,3-cyclopentanedione
2,3,5,6-tetrachlorotetrafluoro-1,4-cyclohexanedione Mixtures of members of the above-described class of starting materials may also be subjected to the fluorination procedure of the invention to produce the corresponding perfluorinated ketones. This feature is particularly advantageous when a convenient source of a mixture of such starting materials is available, each member of which mixture would, upon perfluorination, produce the same product as any other member of that mixture. A good example of this is the case of the perchlorofluoroacetones, which may be produced as mixtures containing varying amounts of chlorine and fluorine. Such a mixture may be used in the invention process per se, without having to separate the components, and the resulting product will consist essentially of hexafluoroacetone.

The ketone starting materials, such as the perchlorofluoroacetones, may be prepared by conventional approaches, such as HF fluorination of the corresponding perchlorinated materials in the presence of catalysts. For example, all of the perchlorofluoroacetones, i.e. those containing from 1–5 fluorine atoms, may be prepared, as is known, by the liquid phase reaction of hexachloroacetone with anhydrous HF and antimony fluorochloride. It is also known that such materials may be prepared by gasphase HF fluorination processes with a variety of solid catalysts, $Cr_2O_3$ for example. A limited class of suitable perhalogenated cycloaliphtic saturated ketone starting materials, in which two chlorine atoms are substituted on one of the cyclic carbon atoms which is in a position alpha to the ketone group, the remainder of the cyclic carbon atoms being perfluorinated, may be prepared by the direct chlorination of the corresponding 1-chloro-2-methoxy-perfluorinated cyclopentenone or cyclohexenone, in the presence of actinic radiation, at temperatures in the range of about 25–150° C.

The process is more fully described in co-pending, commonly assigned application of Louis G. Anello and Richard F. Sweeney, Serial No. 420,154, filed December 21, 1964. This procedure may be applied to perhalogenated cycloaliphatic ketones of the type indicated above in which the carbon content is below 5 or above 6 carbon atoms. Perhalogenated cycloaliphatic ketones within the scope of the definition of the instant starting materials may, in addition to the above-described procedure, be prepared by conventional approaches which involve successive fluorination, dechlorination and fluorination reactions. In this manner, for example, chlorofluoro-cycloaliphatic ketones may be prepared in which all of the carbon atoms in a position alpha to a ketone group are perchlorinated. This may be illustrated by the preparation of 2,2,5,5-tetrachlorotetrafluorocyclopentanone. This compound may be prepared by directly fluorinating perchlorocyclopentenone-3 to form 2,2,3,4,5,5-hexachlorodifluorocyclopentanone, which latter compound is then dechlorinated with zinc metal to form 2,2,5,5-tetrachlorodifluorocyclopentenone-3, which in turn may be directly fluorinated to the desired 2,2,5,5-tetrachlorotetrafluorocyclopentanone product. In a like manner, other perhalogenated cycloaliphatic ketones in which all chlorine atoms present are substituted on carbon atoms in an alpha position to a ketone group may be prepared. In general, chlorofluoroketones possessing chlorine atoms attached only to carbon atoms which are in a position alpha to a ketone group, may be prepared by conventional Grignard reactions in which the appropriate α-chloro-substituted perfluorocarboxylic acid is reacted with the appropriate Grignard reagent, e.g. a perhalogenated alkyl magnesium iodide. The following equation for the preparation of 1,1-dichlorohexafluoro-2-butanone, is illustrative of this preparatory route.

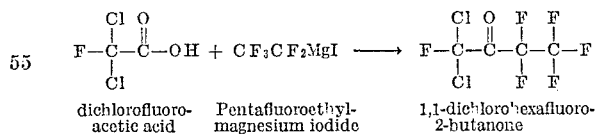

dichlorofluoro-  Pentafluoroethyl-  1,1-dichlorohexafluoro-
acetic acid    magnesium iodide    2-butanone A discussion of the standard procedures which may be used to prepare the appropriate Grignard reagent may be found in Milos Hudlicky, Chemistry of Organic Fluorine Compounds, published by the MacMillan Company, New York (1962) on page 216. The α-chloro-substituted perfluorocarboxylic acid reactant may be prepared by electrochemical fluorination of the corresponding α-chloro-carboxylic acid. Suitable polyketone starting materials, such as the appropriate diketones, may also be prepared by Grignard synthesis, in which case the appropriate chlorofluoro-dicarboxylic acid is employed with the Grignard reagent. Preparation of suitable perchlorofluorocyclic polyketones may also be accomplished through standard approaches. For example, 2,3,5,6-tetrachlorotetrafluoro-1,4-cyclohexanedione may be prepared by fluorinating chloranil, a known compound, with cobaltic fluoride. Upon perfluorination of this material, there is obtained perfluoro-1,4-cyclohexanedione. In an analogous manner, perfluoro-1,3-cyclopentanedione may be prepared. Other methods for preparing starting materials suitable for use according to the process of the invention will occur to those skilled in the art.

The perfluorinated cyclopentanedione and perfluorinated cyclohexanedione products are novel compounds and share a common utility with the other perfluorinated ketones which may be produced according to the process of the invention. The perfluorinated ketones may be reacted with water to form the corresponding hydrates. This reaction may be illustrated by the following equation:

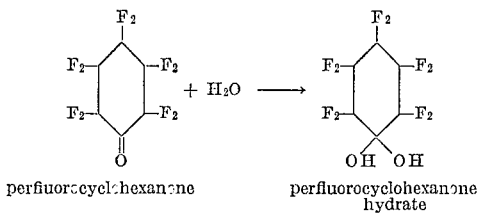

perfluorocyclohexanone      perfluorocyclohexanone hydrate

The perfluorinated ketone hydrate compositions are good solvents for Capran (nylon-6).

Whereas the precise nature of the reaction according to the invention process is not known, it appears that simple metathetical exchange of F— for Cl— takes place with accompanying evolution of inorganic metal chloride as by-product. In general practice of the invention, the process is carried out by adding the perhalogenated, aliphatic, saturated ketone starting material, hereinafter referred to as chlorofluoroketone, to one of the herein indicated inorganic metal fluorides, preferably with the latter suspended in an inert polar solvent. The reaction mixture is preferably heated to promote the reaction and the perfluorinated, aliphatic, saturated ketone product, hereinafter referred to as perfluoroketone, may be recovered in the vaporous or liquid state and subsequently purified by conventional methods.

For best results, the inorganic metal fluoride employed should be in anhydrous form. The presence of water, even in small amounts, will reduce the yield of perfluoroketone obtainable and accordingly even through KF, for example, is commercially available in anhydrous form and may be used as such; it is desirable to further dry the KF immediately prior to use, such as by heating the same in a vacuum oven at about 100–150° C. for a period of about 2–16 hours. Any of KF, CsF, LiF and AgF may be used as the inorganic metal fluoride, however, KF is preferred.

Solvent, if used, may be any organic polar solvent which does not react with the chlorofluoroketone reactant or the perfluoroketone product. To facilitate expression in the claims, this class of organic solvent will be referred to as an inert polar solvent, the term inert referring to the non-reactivity of the solvent with the reactants and products according to the process of the invention. Solvents falling within this definition are well known in the art and include such water-soluble substances as carboxylic acid amides, N-alkyl substituted carboxylic acid amides, dialkyl sulfides, polyalkylene glycol ethers, alkylene carbonates, sulfonates, N-alkylpyrrolidones, nitroalkanes, lactones and ketones. Illustrative specific solvents which may be empolyed include tetrahydrothiophene-1,1-dioxide, dimethylformamide, N-methylacetamide, ethylene carbonate, N - methylpyrrolidone, N-methylformamide, N-methylacetamide, diethylformamide, nitromethane, diethyleneglycol dimethylether and alpha-butyrolactone. Experience has shown that tetrahydrothiopene-1,1-dioxide and dimethylformamide are particularly effective. Other solvents falling within the scope of the definition and being suitable for use in the process of the invention will readily occur to those skilled in the art. Again, so as to avoid introducing undesirable traces of water into the system, the chosen solvent should preferably be used in anhydrous form. The solvent may be dried prior to use by any conventional method, such as by distillation, or by the use of molecular sieves or ordinary drying agents.

The reaction of the invention may be carried out in ordinary reaction vessels constructed of ordinary materials, such as Pyrex or steel, which reaction vessel may be optionally equipped with a condenser, a stirrer, a thermometer and heating or cooling means.

The reaction will proceed to a limited extent in the absence of solvent since the chlorofluoroketone starting material present, particularly if in excess, will serve as such. In such a case, it would be necessary to employ superatmospheric pressures in order to achieve sufficiently elevated temperatures capable of sustaining the reaction. Preferably, of course, one of the above-described solvents should be employed and although the exact amount of solvent is not critical, a sufficient amount to permit thorough mixing of the inorganic metal fluoride and the chlorofluoroketone should be used. A large excess of solvent will not deleteriously affect the reaction. Thus, in a broad sense, the ratio of solvent to inorganic metal fluoride may vary anywhere from 0 to 1,000 or more parts of solvent for each part of inorganic metal fluoride present. The preferred ratio, however, is from about 1–10 parts solvent for each part of inorganic metal fluoride.

When solvent is used, the process may be carried out under either atmospheric or subatmosphereic pressure, as well as superatmospheric pressure. Atmospheric pressure is most practical, however, and accordingly is preferable.

Reaction temperatures are not critical, although somewhat elevated temperatures should be employed in order to insure favorable fluorination rates. Generally, the reaction can be carried out at temperatures as low as about 25° C., but is preferably carried out at temperatures above about 130° C. As would be expected, the higher the reaction temperature, th higher will be the reaction rate. The upper limit at which the reaction may be run is determined by the boiling point of the solvent. Thus, when dimethylformamide (B.P. about 154° C.) is employed as solvent, reaction temperatures may vary from about 25–154° C. When tetrahydrothiophene-1,1-dioxide (B.P. about 285° C.) is employed as solvent, reaction temperatures may vary from about 25–285° C. For maximum conversions and yields, however, operating temperatures should be maintained between about 130–200° C., solvent permitting, and more preferably, between about 150–180° C.

The reaction is moderately endothermic and reaction temperatures may be kept within desired limits by regulating the rate of mixing of the chlorofluoroketone and inorganic metal fluoride reactants to control endotherm, by any conventional heating or cooling means, or by any combination of the above.

The ratio of inorganic metal fluoride to chlorofluoroketone employed is the stoichiometric amount required to effect replacement of all of the chlorine atoms present in the chlorofluoroketone. An excess of about 10% or more of the stoichiometric may be used in order to insure complete reaction. Inorganic metal chloride is evolved as by-product and may be collected and measured. This provides a convenient check on the progress of the reaction.

Product recovery is simple and involves only condensation of the exit gases and subsequent fractional distillation. Thus, the gaseous product mixture may be condensed in a vessel maintained at a temperature substantially below the boiling point of the lowest boiling component of the mixture, such as by indirectly cooling the gaseous mixture by means of an acetone-Dry Ice bath. Substantially pure perfluorinated ketone product may be recovered by distillation of the condensates, obtained as above, and any unreacted chlorofluoroketone starting material may be recycled for subsequent operation. The identity and amounts of product in the gaseous product mixture may be determined by fractional distillation and/or conventional NMR or infrared analytical techniques.

The preferred mode of carrying out the invention is summarized as follows: a 10% stoichiometric excess of anhydrous potassium fluoride relative to the amount of chlorofluoroketone starting material which is to be employed is further dried by heating in a vacuum oven at 100–150° C. for about 2–16 hours. The anhydrous KF is then suspended an anhydrous tetrahydrothiophene-1,1-dioxide or dimethylformamide solvent, in a volume ratio of about 1–10:1 parts anhydrous solvent per part of anhydrous KF. The KF/solvent mixture is then heated to between about 150° C. and the boiling point of the solvent, followed by dropwise addition of the chlorofluoroketone, accompanied by vigorous stirring. The chlorofluoroketone is added at such a rate so as to maintain operating temperatures in the reactor within the above indicated temperature range. Completion of the reaction is determined by measuring the amount of KCl evolved and determining that the stoichiometric amount has been collected. The perfluoroketone product is recovered by condensation of the exit gases followed by fractional distillation.

The following examples illustrate practice of the invention. Parts and percentages are by weight unless otherwise stated. Conversions and yields are given in mole percent. Conversions are obtained by dividing the moles of sought-for product obtained by the moles of chlorofluoroketone starting material fed, multiplied by 100. Yields are based on the chlorofluoroketone starting material and are obtained by dividing moles of sought-for product obtained, by moles of chlorofluoroketone starting material consumed, multiplied by 100.

EXAMPLE 1

30 g. (0.52 mole) of technical grade anhydrous potassium fluoride (KF) were dried overnight in a vacuum oven at about 150° C. The dried KF was suspended in 100 g. of technical grade tetrahydrothiophene-1,1-dioxide. The KF mixture was then charged to a 250 ml. three-necked flask equipped with a stirrer, a thermometer, a dropping funnel and a distilling head, which distilling head was connected to a Dry Ice-acetone cooled trap for collection of product condensates. 50 g. (0.16 mole) of 2,2-dichlorooctafluorocyclohexanone were added slowly to the KF mixture with stirring, over a period of about three hours. At the beginning of the addition of chlorofluoroketone, the reaction mixture was heated to about 215° C. During the three hour addition period the reaction temperature was maintained between about 205–215° C. by controlling the rate of addition of chlorofluoroketone. Reaction product distilled continuously out of the reaction flask during the course of the addition of the chlorofluoroketone and was collected for fractional distillation, both in a receiver at room temperature and as condensate in the Dry Ice-acetone trap. Upon fractionation, 23 g. of a fraction boiling from 50–55° C. and 9 g. of a fraction boiling over 55° C. were recovered from the total crude product. A boiling point determination and infrared analysis of the fraction boiling over 55° C. showed that it consisted essentially of the 2,2-dichlorooctafluorocyclohexanone starting material. The 23 g. of material recovered as a fraction boiling between 50–55° C. was identified, by infrared and nuclear magnetic resonance spectrum and elemental analysis, to be the desired perfluorocyclohexanone product. The NMR absorption spectrum was compatible with a perfluorocyclic ketone. Infrared absorption bands were at 5.6 (C=O), 7.65, 7.95, 8.4, 10.05 and 10.35 microns. The percent of fluorine calculated for $C_6F_{10}O$ was 68.3. The percent of fluorine found on elemental analysis of the product was 67.6. Conversion of 2,2-dichlorooctafluorocyclohexanone to perfluorocyclohexanone was 52% and the yield was 63%.

EXAMPLE 2

50 g. (0.86 mole) of technical grade anhydrous potassium fluoride (KF) were dried overnight in a vacuum oven at about 150° C. The dried KF was suspended in 150 g. of technical grade tetrahydrothiophene-1,1-dioxide. The KF mixture was then charged to a 250 ml. three-necked flask equipped with a stirrer, a thermometer, a dropping funnel and a distilling head, which distilling head was connected to a Dry Ice-acetone cooled trap for collection of product condensates. 68 g. (0.22 mole) of 2,2-dichlorooctafluorocyclohexanone were added slowly to the KF mixture, with stirring, over a period of about three hours. At the beginning of the addition of chlorofluoroketone, the reaction mixture was heated to about 155° C. During the three hour addition period the reaction temperature was maintained between about 150–155° C. by controlling the rate of addition of chlorofluoroketone. Approximately one hour after addition of chlorofluoroketone commenced, reaction product began to distill out the reaction flask and was collected for fractional distillation, both in a receiver at room temperature and as condensate in the Dry Ice-acetone trap. Upon fractional distillation, 31 g. of a fraction boiling from 54–56° C. and 22 g. of a fraction boiling over 56° C. were recovered from the total crude product. Boiling point and infrared comparisons of the 54–56° C. and >56° C. fractions with the fractions obtained in Example 1 showed that the >56° C. fraction consisted essentially of 2,2-dichlorooctafluorocyclohexanone starting material, whereas the 54–56° C. fraction was the desired perfluorocyclohexanone product. Conversion of 2,2-dichlorooctafluorocyclohexanone to perfluorocyclohexanone was 50.5% and the yield was 74%.

EXAMPLE 3

58 g. (1.0 mole) of technical grade anhydrous potassium fluoride (KF) were suspended in 200 g. of freshly distilled dimethylformamide. The KF mixture was charged to a 250 ml. three-necked flask equipped with a stirrer, a thermometer, a dropping funnel and a distilling head, which distilling head was connected to a Dry Ice-acetone cooled trap for collection of product condensates. 100 g. (0.38 mole) of 2,2-dichlorohexafluorocyclopentanone were added slowly to the KF mixture, with stirring, over a period of about three hours. At the beginning of the addition of chlorofluoroketone, the reaction mixture was heated to about 154° C. During the three hour addition period the reaction temperature was maintained between about 150–154° C. by controlling the rate of addition of chlorofluoroketone. Organic reaction product was removed as formed and was collected for fractional distillation, both in a receiver at room temperature and as condensate in the Dry Ice-acetone trap. Upon fractionation, 30 g. of a fraction boiling at about 23–24° C. were recovered from the total crude product. The 23–24° C. fraction was identified, by infrared, nuclear magnetic resonance spectrum and elemental analysis, to be the desired perfluorocyclopentanone product. The NMR absorption spectrum was compatible with a perfluorocyclic ketone. Infrared absorption bands were at 5.5 (C=O), 8.3, 9.15, 9.80 and 10.3 microns. The percent of fluorine calculated for $C_5F_8O$ was 66.7. The percent of fluorine found on elemental analysis of the product was 65.1. Conversion of 2,2-dichlorohexafluorocyclopentanone to perfluorocyclopentanone was 34% and the yield was 52%.

EXAMPLE 4

30 g. (0.52 mole) of technical grade anhydrous potassium fluoride (KF) were suspended in 100 g. of technical grade tetrahydrothiophene-1,1-dioxide. The KF mixture was charged to a 250 ml. three-necked flask equipped with a stirrer, a thermometer, a dropping funnel and a distilling head, which distilling head was connected to a Dry Ice-acetone cooled trap for collection of product condensates. 30 g. (0.15 mole) of tetrafluorodichloroacetone were added slowly to the KF mixture, with stirring, over a period of about one hour. At the beginning of the addition of chlorofluoroketone, the reaction mixture was heated to about 190° C. During the one hour addition period, the reaction temperature was maintained between about 180–190° C. by controlling the rate of addition of chlorofluoroketone. Reaction product distilled continuously out of the reaction flask during the course of the addition of the chlorofluoroketone and was collected for fractional distillation in the Dry Ice-acetone trap. Upon fractionation, 14 g. of a fraction boiling about −24.0 to −25.5° C. was recovered from the total crude product. Infrared and gas chromatographic analysis indicated that this product consisted essentially of hexafluoroacetone. Conversion of tetrafluorodichloroacetone to hexafluoroacetone was 56% and the yield was 67%.

EXAMPLE 5

17.4 g. (0.30 mole) of technical grade anhydrous potassium fluoride (KF) were suspended in a 20 g. of technical grade dimethylformamide. The KF mixture was then charged to a 100 ml. four-necked flask equipped with a magnetic stirrer, a thermometer, a dropping funnel and a reflux condenser, which reflux condenser was connected to a Dry Ice-acetone cooled trap for collection of product condensates. 20 g. (0.10 mole) of tetrafluorodichloroacetone were added dropwise to the KF mixture, with vigorous stirring. At the beginning of the addition of chlorofluoroketone, the reaction mixture was heated to about 154° C. During the addition period the reaction temperature was maintained between about 150–154° C. by controlling the rate of addition of chlorofluoroketone or by increasing the heat supplied to the reaction mixture. Reaction product distilled continuously out of the reaction flask during the course of the addition of the chlorofluoroketone and 12.4 g. of crude product was condensed and collected in the Dry Ice-acetone trap. The trap contents were allowed to warm up to room temperature and the volatile material evolving therefrom was condensed and collected in a second acetone-Dry Ice cooled trap. The non-volatile portion (5.9 g.) was subjected to gas chromatographic analysis and was found to contain 81 volume percent tetrafluorodichloroacetone. The volatile portion (4.9 g.) was analyzed by gas chromatographic analysis and infrared absorption and was found to contain 88 volume percent hexafluoroacetone.

EXAMPLE 6

30 g. (0.52 mole) of technical grade anhydrous potassium fluoride (KF) is dried overnight in a vacuum oven at about 150° C. The dried KF is suspended in 150 g. of technical grade dimethylformamide. The KF mixture is then charged to a 250 ml. three-necked flask equipped with a stirrer, a thermometer, a dropping funnel and a distilling head, which distilling head is connected to a Dry Ice-acetone cooled trap for collection of product condensates. 50 g. (0.15 mole) of 2,3,5,6-tetrachlorotetrafluoro-1,4-cyclohexanedione are added dropwise to the KF mixture, with stirring. At the beginning of the addition of chlorofluoroketone, the reaction mixture is heated to about 154° C. During the addition period, the reaction temperature is maintained between about 150–154° C., by controlling the rate of addition of chlorofluoroketone. Reaction product is distilled out of the reaction flask and is collected as condensate in the Dry Ice-acetone trap. The product obtained is perfluoro-1,4-cyclohexanedione.

EXAMPLE 7

2.4 g. (0.13 mole) of distilled water is slowly added to a 50 ml. round bottom flask, containing 20 g. (0.078 mole) of perfluoro-1,4-cyclohexanedione. Upon the addition of the water, there is an immediate formation of a crystalline solid with the liberation of heat. The reaction mixture solidifies after all the water is added. Distillation yields a small amount of unreacted perfluor-1,4-cyclohexanedione and a residue of about 20 g. (0.068 mole) of sought-for perfluoro-1,4-cyclohexanedione dihydrate product.

EXAMPLES 8–25

When the process of Example 1 is repeated, excepting that the materials shown in the following table, in the column labeled chlorofluoroketone, are used as starting materials, the reaction proceeds substantially as described with the corresponding perfluorinated product obtained being shown oppositely in the column labeled perfluoroketones.

| Ex. | Chlorofluoroketone | Perfluoroketone |
|---|---|---|
| 8 | Monochloropentafluoroacetone | Hexafluoroacetone. |
| 9 | Sym-tetrachlorodifluoroacetone | Do. |
| 10 | Asym-tetrachlorodifluoroacetone | Do. |
| 11 | Sym-trichlorotrifluoroacetone | Do. |
| 12 | Asym-trichlorotriflurooacetone | Do. |
| 13 | 1,1-dichlorohexafluoro-2-butanone | Perfluoro-2-butanone. |
| 14 | 2,2-dichlorooctafluoro-3-pentanone | Perfluoro-3-pentanone. |
| 15 | 3-chloroundecafluoro-2-hexanone | Perfluoro-2-hexanone. |
| 16 | 3-chloropentadecafluoro-4-octanone | Perfluoro-4-octanone. |
| 17 | 4,4-dichlorodocosafluoro-3-dodecanone | Perfluoro-3-dodecanone. |
| 18 | 1,1,1-trichloro-4-trifluoromethyl-hexanfluoro-2-pentanone | 4-trifluoromethylperfluoro-2-pentanone. |
| 19 | 4,4-dichloro-5-trifluoromethyl-5-pentafluoroethyldodecafluoro-3-octanone | 5-trifluoromethyl-5-pentafluoro-ethyl-perfluoro-3-octanone. |
| 20 | 2,2-dichlorotetrafluorocyclobutanone | Perfluorocylobutanone. |
| 21 | 2,4,4-trichlorotrifluorocyclobutanone | Do. |
| 22 | 2,2,5,5-tetrachlorotetrafluorocyclopentanone | Perfluorocylcopentanone. |
| 23 | 3,3-dichlorooctafluoro-2,4-hexanedione | Perfluoro-2,4-hexanedione. |
| 24 | 2,4,5-trichlorotrifluoro-1,3-cyclopentanedione | Perfluoro-1,3-cyclopentanedione. |
| 25 | 2,2-dichlorohexafluoro-1,3-cyclohexanedione | Perfluoro-1,3-cyclohexanedione. |

EXAMPLE 26

1.5 g. (0.083 mole) of distilled water were slowly added to a 50 ml. round bottom flask containing 25 g. (0.09 mole) of perfluorocyclohexanone, B.P. 54° C. As soon as the water was added, there was an immediate formation of a crystalline solid with the liberation of heat. After all the water was added, the reaction mixture solidified. Distillation yielded 0.5 g. (0.002 mole) of perfluorocyclohexanone (B.P. 54° C.) and a residue of 25 g. (0.084 mole) of the sought-for perfluorocyclohexanone hydrate product (M.P. 129–130° C.).

*Analysis.*—Calculated for $C_6H_2F_{18}O_2$: F, 64.5%; H, 0.68%. Found: F, 63.3%; H, 0.71%.

EXAMPLE 27

A mixture of one part Capran film and about 10 parts of perfluorocyclohexanone hydrate was refluxed in a 100 ml. round bottom flask, for a period of one hour to effect solution. At the end of this period, 2.5 parts of water were added to the solution, followed by the addition of about two parts of Capran. The resulting mixture was heated to reflux temperature and became a clear, viscous solution. A flexible, transparent, plastic (Capran) film was then easily prepared by flowing the solution of Capran thus obtained by the above procedure, on to a polished plate, evaporating the essentially hydrate solvent and peeling the resulting film from the plate.

EXAMPLE 28

1.7 g. (0.094 mole) of distilled water were slowly added to a 25 ml. round bottom flask containing 24 g. (0.10 mole) of perfluorocyclopentanone (B.P. 22–24°

C.). As soon as the water was added, there was an immediate formation of a crystalline solid with the liberation of heat. After all the water was added, the reaction mixture solidified. Distillation yielded 0.7 g. (0.003 mole) of perfluorocyclopentanone (B.P. 24° C.) and a residue of 25 g. (0.10 mole) of the sought-for perfluorocyclopentanone hydrate (B.P. 124–125° C., M.P. 75–76° C.).

*Analysis.*—Calculated for $C_5H_2F_8O_2$: F, 61.8%, H, 0.81%. Found: F, 60.5%; H, 0.91%.

EXAMPLE 29

A mixture of one part Capran film and about 10 parts of perfluorocyclopentanone hydrate was refluxed in a 100 ml. round bottom flask, for a period of one hour to effect solution. At the end of this period, 3.2 parts of water were added to the solution, followed by the addition of about two parts of Capran. The resulting mixture was heated to reflux temperature and became a clear, viscous solution. A flexible, transparent, plastic (Capran) film was then easily prepared by flowing the solution of Capran, thus obtained by the above procedure, on to a polished plate, evaporating the essentially hydrate solvent and peeling the resulting film from the plate.

EXAMPLE 30

A mixture of one part Capran film and about 10 parts of perfluoro-1,4-cyclohexanedione dihydrate is refluxed in a 100 ml. round bottom flask, for a period of one hour to effect solution. At the end of this period, 2.3 parts of water are added to the solution, followed by the addition of about two parts of Capran. The resulting mixture is heated to reflux temperature and becomes a clear, viscous solution. A flexible, transparent, plastic (Capran) film is then easily prepared by flowing the solution of Capran, thus obtained by the above procedure, on to a polished plate, evaporating the essentially hydrate solvent and peeling the resulting film from the plate.

EXAMPLE 31

2.2 g. (0.12 mole) of distilled water are slowly added to a 50 ml. round bottom flask, containing 18 g. (0.087 mole) of perfluoro-1,3-cyclopentanedione. Upon the addition of the water, there is an immediate formation of a crystalline solid with the liberation of heat. The reaction mixture solidifies after all the water is added. Distillation yields a small amount of unreacted perfluoro-1,3-cyclopentanedione and a residue of about 18 g. (0.074 mole) of sought-for perfluoro-1,3-cyclopentanedione dihydrate.

EXAMPLE 32

A mixture of one part Capran film and about 10 parts of perfluoro-1,3-cyclopentanedione dihydrate is refluxed in a 100 ml. round bottom flask, for a period of one hour to effect solution. At the end of this period, 2.1 parts of water were added to the solution, followed by the addition of about 1.9 parts of Capran. The resulting mixture is heated to reflux temperature and becomes a clear, viscous solution. A flexible, transparent, plastic (Capran) film is then easily prepared by flowing the solution of Capran, thus obtained by the above procedure, on to a polished plate, evaporating the essentially hydrate solvent and peeling the resulting film from the plate.

Other perfluorinated, aliphatic, saturated ketones which may be produced in accordance with the invention, may be converted to the corresponding hydrates by the addition of water, which hydrates may be used as solvents for Capran and in the casting of Capran films therefrom.

Since those skilled in the art will readily be able to make modifications and innovations over the embodiments described, it should be understood that the invention is not to be limited except by the scope of the appended claims.

We claim:
1. A process for preparing a perfluorinated, aliphatic, saturated ketone which comprises reacting a perhalogenated, aliphatic, saturated ketone containing only:
   (a) carbon atoms, one or more of which are associated as ketone groups,
   (b) one or more oxygen atoms, each of which is associated as a ketone group,
   (c) one or more chlorine atoms, each of which is attached to a carbon atom which is in a position alpha to a ketone group, and
   (d) one or more fluorine atoms taking up the remainder of the unsatisfied valences of the carbon atoms,
with at least the stoichiometric amount of KF required to effect replacement of all of the chlorine atoms present in the perhalogenated, aliphatic, saturated ketone, in the presence of an inert polar solvent and at temperatures from about 25° C. to about the boiling point of the solvent employed.

2. The process of claim 1 in which the perhalogenated, aliphatic, saturated ketone is a perhalogenated, open chain, aliphatic, saturated ketone.

3. The process of claim 1 in which the perhalogenated, aliphatic, saturated ketone is a perhalogenated, cycloaliphatic, saturated ketone.

4. The process of claim 1 in which the perhalogenated, aliphatic, saturated ketone is a perhalogenated, aliphatic, saturated polyketone.

5. The process of claim 1 in which the reaction is carried out at temperatures above about 130° C.

6. A process for preparing hexafluoroacetone which comprises reacting a perhalogenated acetone, in which the halogen atoms are members selected from the group consisting of chlorine and fluorine, there being present at least one chlorine atom and one fluorine atom in the molecule, with at least the stoichiometric amount of KF required to effect replacement of all of the chlorine atoms present in the perhalogenated acetone, in the presence of an inert polar solvent and at temperatures from about 25° C. to about the boiling point of the solvent employed.

7. The process of claim 6 in which the reaction is carried out at temperatures above about 130° C.

8. The process of claim 6 in which the perhalogenated acetone is sym-tetrafluorodichloroacetone.

9. The process of claim 8 in which the reaction is carried out at temperatures above about 130° C.

10. A process for preparing perfluorocyclohexanone which comprises reacting a perhalogenated cyclohexanone in which there are present:
   (a) one or more chlorine atoms, each of which is attached to a carbon atom which is in a position alpha to the ketone group, and
   (b) one or more fluorine atoms taking up the remainder of the unsatisfied valences of the carbon atoms,
with at least the stoichiometric amount of KF required to effect replacement of all of the chlorine atoms present in the perhalogenated cyclohexanone, in the presence of an inert polar solvent and at temperatures from about 25° C. to about the boiling point of the solvent employed.

11. The process of claim 10 in which the perhalogenated cyclohexanone is 2,2 - dichlorooctafluorocyclohexanone and in which reaction temperatures are maintained above about 130° C.

12. A process for preparing perfluorocyclopentanone which comprises reacting a perhalogenated cyclopentanone in which there are present:
   (a) one or more chlorine atoms, each of which is attached to a carbon atom which is in a position alpha to the ketone group, and
   (b) one or more fluorine atoms taking up the remainder of the unsatisfied valences of the carbon atoms,
with at least the stoichiometric amount of KF required to effect replacement of all of the chlorine atoms present in the perhalogenated cyclopentanone, in the presence of an inert polar solvent and at temperatures from about 25° C. to about the boiling point of the solvent employed.

13. The process of claim 12 in which the perhalogenated cyclopentanone is 2,2 - dichlorohexafluorocyclopentanone and in which reaction temperatures are maintained above about 130° C.
14. Perfluoro-1,3-cyclohexanedione.
15. Perfluoro-1,3-cyclohexanedione dihydrate.
16. Perfluoro-1,3-cyclopentanedione.
17. Perfluoro-1,4-cyclohexanedione.
18. Perfluoro-1,3-cyclopentanedione dihydrate.
19. Perfluoro-1,4-cyclohexanedione dihydrate.

References Cited
UNITED STATES PATENTS
2,614,129 10/1952 McBee _____ 260—593

OTHER REFERENCES

Shepard, "J. Org. Chem.," vol. 23, pp. 2012 to 2013 (1958).

Hudlicky, "Chemistry of Org. Fluorine Cpds.," pp. 64, 87, 104, 106 and 107 (1962).

LEON ZITVER, *Primary Examiner.*

M. JACOB, *Assistant Examiner.*